Figure 1:
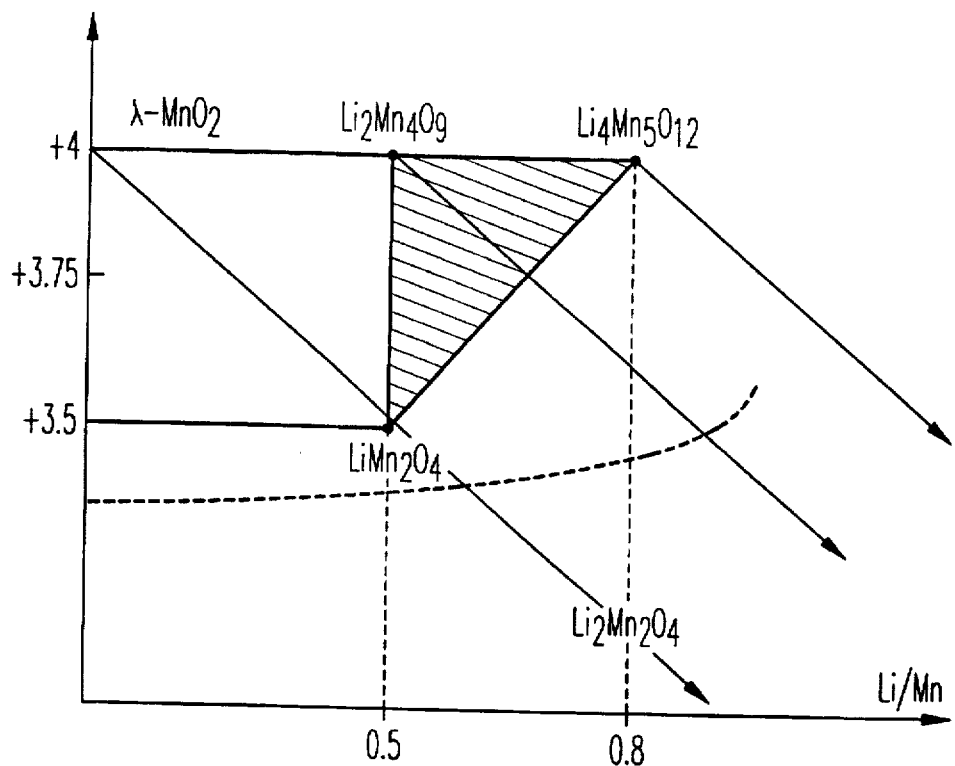

United States Patent [19]
Bloch et al.

[11] Patent Number: 5,700,442
[45] Date of Patent: Dec. 23, 1997

[54] INSERTION COMPOUNDS BASED ON MANGANESE OXIDE USABLE AS THE POSITIVE ELECTRODE ACTIVE MATERIAL IN A LITHIUM BATTERY

[75] Inventors: Didier Bloch, St Ismier; Frédéric Le Cras, L'Isle D'Abeau; Pierre Strobel, Saint-Egreve, all of France

[73] Assignees: Commissariat a l'Energie Atomique; Electricite de France Service National, both of Paris; Bollore Technologies S.A., Quimper, all of France; Sadacem, S.A., Brussels, Belgium

[21] Appl. No.: 492,141

[22] Filed: Jun. 19, 1995

[30] Foreign Application Priority Data

Jun. 21, 1994 [FR] France ................................... 94 07569

[51] Int. Cl.$^6$ ............................................. C01G 45/12
[52] U.S. Cl. ................................. 423/599; 429/224
[58] Field of Search ........................................ 423/599

[56] References Cited

U.S. PATENT DOCUMENTS 4,959,282  9/1990  Dahn et al. ............................. 423/605

FOREIGN PATENT DOCUMENTS 0 413 313  2/1991  European Pat. Off. .
210028     8/1988  Japan .

OTHER PUBLICATIONS

Journal of the Electrochemical Society, vol. 141, No. 1, Jan. 1994, pp. 10–15, Susumu Kuwabata, et al., "Electrochemical Synthesis of Composite Films of Manganese Dioxide and Polypyrrole and Their Properties as an Active Material in Lithium Secondary Batteries".

Journal of Power Sources, vol. 25, No. 3, Mar. 1989, pp. 177–185, N. Ilchev, et al., "The Lithium–Manganese Dioxide Cell II. Behavior of Manganese Dioxide in Nonaqueous Electrolyte".

Database WPI, Derwent Publications, AN–95–191409, JP–7–111153, Apr. 25, 1995.

*Primary Examiner*—Wayne Langel
*Attorney, Agent, or Firm*—Oblon, Spivak, McClelland, Maier & Neustadt, P.C.

[57] ABSTRACT

The invention relates to the preparation of insertion compounds based on manganese oxide, usable as the positive electrode active material in a lithium battery.

These compounds in the hatched area of FIG. 1 can be prepared by reacting in the solid state a manganese oxide powder $MnO_2$-$\beta$, having a specific surface below 7 $m^2/g$ and an average grain size below 10 μm, with a powder of a lithium compound such as $Li_2CO_3$ or $LiOH$, at a temperature of 150° to 500° C. for an adequate time to convert the $\beta$-$MnO_2$ into manganese and lithium oxide having a lacunary or stoichiometric spinel structure.

10 Claims, 4 Drawing Sheets

INSERTION COMPOUNDS BASED ON MANGANESE OXIDE USABLE AS THE POSITIVE ELECTRODE ACTIVE MATERIAL IN A LITHIUM BATTERY

The present invention relates to the preparation of insertion compounds based on manganese oxide having special physicochemical characteristics with a view to a use as the positive electrode active material in an electrochemical generator.

More specifically, it relates to insertion compounds based on lithium and manganese oxide for electrochemical generators, whose operating principle is based on the insertion and deinsertion (or intercalation and deintercalation) of an alkali metal ion constituted by lithium.

In such electrochemical generators, the electrochemical reaction responsible for current generation involves the transfer, by means of lithium ion-conducting electrolyte, lithium cations from a negative electrode, which are intercalated in the acceptor network of the positive electrode. The ionic conductive electrolytes can either be in liquid form, or in solid form.

When the conductive electrolyte is in liquid form, it can penetrate the grains of the active electrode material and wet the entire surface thereof. It is therefore preferable for the positive electrode to have a high specific surface, a low density and a high porosity, in order to increase the active surface of the electrode. It is consequently possible to improve the exchanges between the electrolyte and the positive electrode, namely electron transfers and the available power density.

When use is made of a solid electrolyte, the aim is still to have the greatest possible electrode surface. However, in this case the electrolyte, constituted by macromolecules, does not penetrate any pores in the active material.

Thus, the maximum available electrode surface will be that constituted by the outer surface of the grains. Moreover, with a view to giving the electrode the highest possible energy density, it is necessary for the active material to occupy most of the volume of the thin cathode film and therefore avoid the presence of pores (not filled by the solid electrolyte) in the active material. This is why it is appropriate when using a solid electrolyte to arrange grains of active materials in as dense a manner as possible, which avoids spaces which are prejudicial to the energy density of the electrode and having the smallest possible grain size, which leads to an increase in the electrode surface.

Several insertion compound types can be used in such electrochemical generators, but for some years now preference has been given to insertion compounds based on manganese oxide, because they have good electrochemical properties (high energy density, good reversibility for the insertion of lithium), whilst being less harmful to the environment and/or more economic than other insertion compounds used such as $V_2O_5$ and nickel or cobalt oxides.

EP-A-279 235 e.g. describes the use of an insertion compound based on manganese oxide as the positive electrode in an electrochemical generator.

EP-A-265 950 also describes the use as the active material of a positive electrode manganese dioxide containing $Li_2MnO_3$ obtained by the heat treatment of a mixture of $MnO_2$ and a lithium salt.

In these two documents where the electrolyte used is a liquid electrolyte, the sought aim is to obtain an active electrode material having a high specific surface, a low density and a high porosity. Moreover, according to EP-A-265 950, it is important to use $Li_2MnO_3$ for obtaining a good behaviour during the cycling (charging/discharging) of the electrode.

Research carried out by Thackeray et al on manganese and lithium oxide systems reported in Mat. Res. Bull., vol.28, 1993, pp.1041–1049 demonstrates that it is possible to obtain different spinel structure insertion compounds by reacting in the solid state manganese carbonate and lithium carbonate powders. It is also possible to obtain lithium and manganese oxide spinels of formula $LiMn_2O_4$ by reaction in the solid state of $\gamma$-$MnO_2$ prepared electrolytically and $Li_2CO_3$ at 700° C., as described in J. Electrochem. Soc., vol.139, no.2, 1992, pp.363–366.

The preparation of lacunary spinels belonging to the system $Li_2O$ , $\gamma MnO_2$ with $2.5 \leq y \leq 4$ by reacting lithium carbonate and manganese carbonate at 400° C. in air is also described by A. de Kock et al in Mat. Res. Bull., vol.25, 1990, pp.657–664. According to this document, an electrode material $Li_2Mn_4O_9$ is obtained with a high specific surface (78 m²/g), a small particle size (3 μm) and a good electrochemical activity. However, on preparing a $LiMn_2O_4$ electrode at temperatures above 600° C., much smaller specific surfaces are obtained (2 to 10 m²/g), which leads to inferior electrode electrochemical performance characteristics. Another of the reasons advanced for explaining the poor electrochemical reversibility of spinels synthesized at high temperature (600° to 850° C.) is as follows. The spinel structures obtained at high temperature (around 800° C.) converge towards formulations of type $LiMn_2O_4$, in accordance with the following reaction diagram:

$$4MnO_2 + Li_2CO_3 \rightarrow 2LiMn_2O_4 + CO_2 + \tfrac{1}{2} O_2.$$

Thus, in this spinel, the manganese is in the degree of oxidation +3.5. However, in an electrochemical generator during the electrochemical insertion of the cation from the negative electrode ($Li^+$), $LiMn_2O_4$ passes from a cubic structure to a quadratic structure, the phase change being accompanied by a deformation effect of the ratio c/a of about 16% of the crystal lattice parameters of the active material. This so-called Jahn-Teller effect is produced at around the degree of oxidation +3.4 of manganese. This deformation is reproduced during each charging/discharging cycle and is assumed to lead to a progressive capacity loss.

Therefore for a use in an electrochemical generator, it is important to use a formulation sufficiently removed from the limit of the Jahn-Teller effect (FIG. 1) to avoid to the greatest possible extent a degree of oxidation of Mn lower than 3.4 during discharge. Moreover, as can be gathered from the aforementioned documents, it is appropriate to obtain the following physicochemical characteristics:

high specific surface (above 50 m²/g), low crystallinity and degree of oxidation of manganese which is as high as possible (close to 4).

The present invention relates to insertion compounds based on manganese oxide having a stoichiometric or lacunary spinel structure which, although having a small specific surface and a density close to the theoretical value, have good electrochemical properties and which are usable not only in electrochemical generators with a solid electrolyte, but optionally also in liquid electrolyte generators.

According to the invention, it has been found that it was possible to obtain an insertion compound based on lithium manganese oxide having a stoichiometric or lacunary spinel structure with a small specific surface and a density close to the theoretical value between 4.1 and 4.5, by the complete reaction in the solid state of a manganese oxide powder having a pyrolusite structure β-MnO$_2$, with a small specific surface with a lithium oxide or salt at not very high temperatures not exceeding 500° C.

This result is entirely surprising because, bearing in the mind the assumed low reactivity of the pyrolusite structure manganese oxide β-MnO$_2$ used as one of the precursors in the synthesis reaction, it would not have been expected that a complete low temperature reaction would be obtained (150°–500° C.) leading to the obtaining of the sought spinel structures. It would have in fact been expected under the conditions of the experiment, that the reaction would not be complete and that there would be a significant proportion of β-MnO$_2$ which had not reacted in the final mixture. In this case, the Li/Mn stoichiometry of the end product cannot correspond to the initial stoichiometry, which leads to a poor evaluation of the formulation of the synthesized spinel structure compound corresponding to the presence in the final mixture of undesirable products (residue of precursors which have not reacted, or products formed linked with local super stoichiometries or sub stoichiometries).

Moreover, the pyrolusite structure manganese oxide β-MnO$_2$ has particularly interesting chemical purity characteristics for the production of products for electrochemical applications.

The invention also relates to a process for the preparation of an insertion compound based on lithium and manganeses oxide, which consists of reacting a manganese oxide powder MnO$_2$-β, which has a specific surface below 7 m$^2$/g and an average grain size below 10 μm, with a powder of a lithium compound chosen from among oxides, hydroxides, carbonates and nitrates, which may or may not be hydrated, of lithium, at a temperature of 150° to 500° C. for a sufficient time to convert MnO$_2$ into manganese and lithium oxide having a stoichiometric or lacunary spinel structure.

According to the invention, the choice of the characteristics (specific surface and grain size) of the starting MnO$_2$-β powder and the synthesis conditions play a preponderant part in the texture of the end product, because there is a marked correlation between the texture of the starting product and that of the end product. Thus, starting with a powder having a small specific surface and small grain size, in which the degree of oxidation of the manganese is +4, it is possible to obtain an insertion compound of small specific surface, having a degree of oxidation of the manganese between +3.5 and +4, having high crystalline quality and purity and which also has interesting electrochemical properties for a use as the active electrode material in an electrochemical generator.

For performing the process of the invention, it is possible to start with a manganese oxide β-MnO$_2$ with a pyrolusite structure, which has a high hardness. In general, this product is available in the form of grains with an average grain size exceeding 5 μm and which is not normally favourable for performing solid—solid-based homogeneous chemical reactions.

In view of the fact that this product is very difficult to finely divide, its use in a synthesis process by reaction in the solid state was difficult to envisage on the part of the expert.

However, according to a preferred performance procedure according to the invention, use is made of MnO$_2$-β with a smaller average grain size, e.g. in the range 0.5 to 5 μm. Such a powder can be supplied by SEDEMA, Tertre, Belgium.

In order to perform the process of the invention, use is made of quantities of MnO$_2$-β and lithium compound such that they correspond to the sought stoichiometry, i.e. with an atomic ratio of the lithium to the manganese of 0.5 to 0.8.

In this process, the atomic ratio of the lithium to the manganese in the end product is dependent on the initial Li/Mn atomic ratio and the temperature used for performing the reaction.

Thus, it has been found that for a given, initial α=Li/Mn ratio, there is only one reaction temperature T$_α$ leading by complete reaction to an end product having the same atomic ratio α=Li/Mn. If the reaction is performed at a temperature below T$_α$, an end product with a stoichiometric spinel structure is obtained in which the atomic ratio Li/Mn is below α, with residual lithium salt.

If the reaction is performed at a temperature above T$_α$ with a rapid temperature rise, an end product with a stoichiometric spinel structure is obtained having an atomic ratio Li/Mn above α with residual β-MnO$_2$ which has not reacted.

If the reaction is performed at a temperature above T$_α$ with a slow temperature rise, a stoichiometric spinel structure product is obtained with a Li/Mn atomic ratio equal to α on reaching the temperature T$_α$, but on exceeding said temperature T$_α$, an end product of lacunary spinel structure is obtained having the same Li/Mn atomic ratio equal to α, but with a degree of oxidation of the manganese above that of the stoichiometric spinel.

Thus, according to the invention, the Li/Mn atomic ratio and the degree of oxidation of the manganese of the insertion compound obtained is regulated by choosing the reaction temperature as a function of the initial Li/Mn atomic ratio between the manganese oxide and the lithium compound.

Preferably, the reaction is performed in a rotary furnace with oxygen scavenging, because the impacts between the oxide grains in such a furnace are beneficial, because they make it possible to carry out the reaction up to the core of the grains. Thus, the softer spinel structure material which forms during the reaction on the surface of the MnO$_2$ grains can be partly removed from the grains during impacts between said grains, so that the spinel formation can be continued to the core or nucleus of the grains. The reaction time is chosen as a function of the temperature used and the grain size of the starting powders. Generally times between 5 and 150 h are suitable.

The invention also relates to stoichiometric or lacunary spinel structure insertion compounds based on manganese an lithium oxide obtained by this process. These insertion compounds are characterized by a Li/Mn atomic ratio of 0.5 to 0.75, a degree of oxidation of the manganese of 3.5 to 3.92, a specific surface below 7 m$^2$/g and a mesh parameter between 8.12 and 8.25 Å corresponding to a density between 4.1 and 4.5

Such compounds are located within the zone delimited by the triangle Li$_2$Mn$_4$O$_9$, Li$_4$Mn$_5$O$_{12}$ and LiMn$_2$O$_4$ of the LiMnO phase diagram (FIG. 1).

These insertion compounds can be used as the active electrode material in liquid electrolyte or solid polymer electrolyte batteries, e.g. usable for stationary or portable equipment, or electric traction, or in primary batteries or cells.

In these batteries, it is possible to use a negative electrode of lithium or a lithium alloy and conventional electrolytes such as those used up to now in lithium generators.

The insertion compounds based on manganese oxide having the aforementioned physicochemical properties are of great interest in the field of lithium batteries.

Thus, their implementation in the form of cathode layers is facilitated, particularly when the latter are processed in thin film form using solid electrolyte technology.

They can be used both with liquid and solid electrolytes. Thus, in the case of liquid electrolyte batteries, at least partly the contact surface loss due to the use of dense grains is compensated by a finer grain size making it possible to obtain a better dispersion of the product in the positive electrode corresponding to a better homogeneity of said electrode and leading to a better manufacturing reproducibility, as well as to a reduced influence of the deformation caused by the successive insertions and deinsertions of the lithium with respect to the active electrode material.

Other features and advantages of the invention can be gathered from the following description of non-limitative examples with reference to the attached drawings, wherein show:

FIG. 1 A diagram illustrating the composition of the insertion compounds according to the invention.

Figure 2:
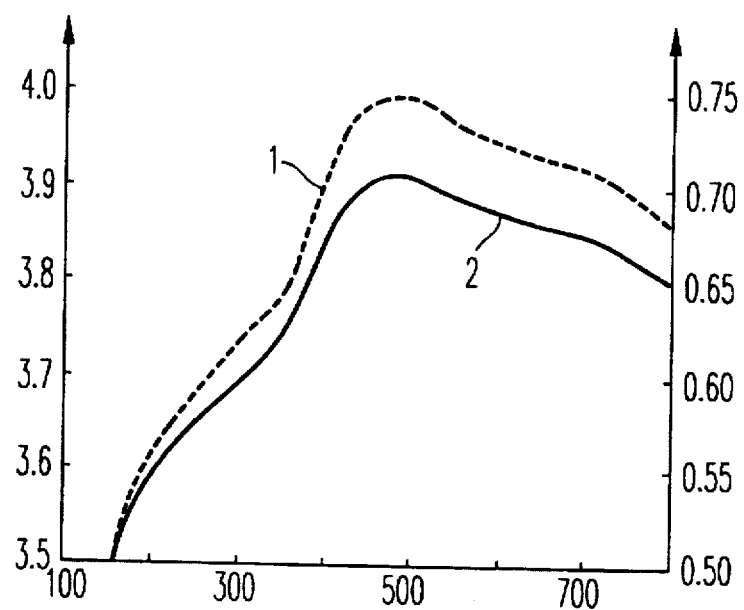

FIG. 2 A diagram giving the composition (Li/Mn atomic ratio—curve 1) and degree of oxidation of the manganese (curve 2) of the stoichiometric spinel phase $Li_\alpha MnO_{4(\alpha+1)/3}$ synthesized by reaction of $\beta\text{-}MnO_2$ and a lithium compound as a function of the synthesis temperature.

Figure 3:
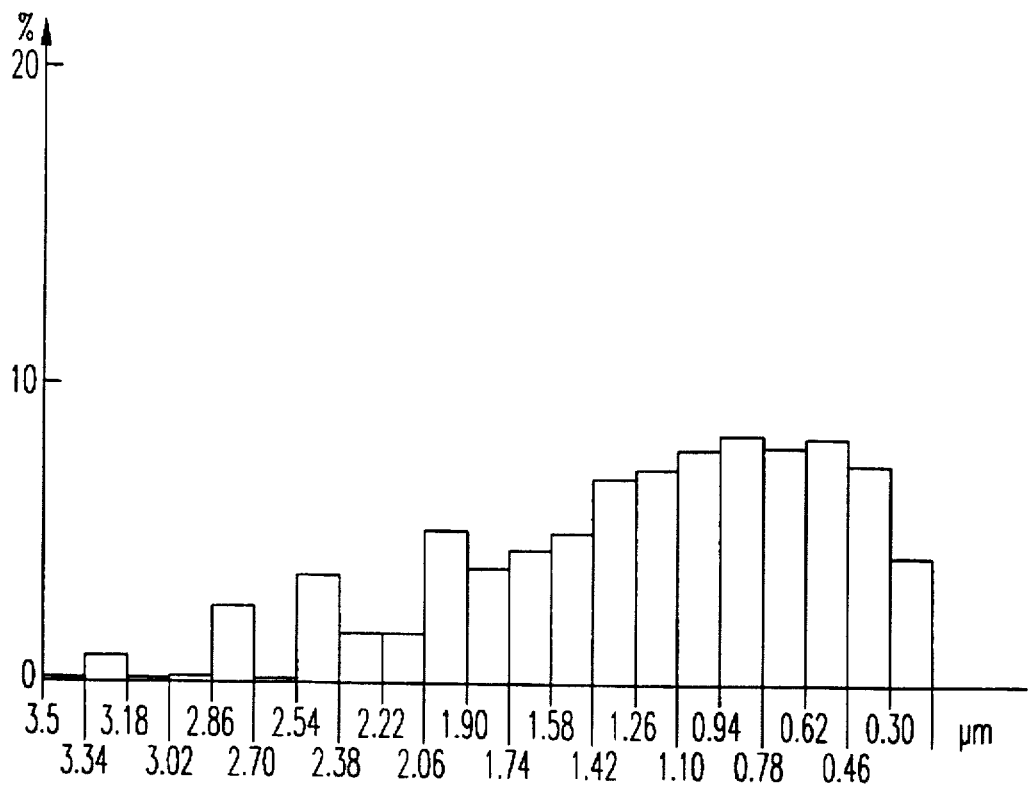

FIG. 3 A grain size distribution histogram of the $MnO_2\text{-}\beta$ powder with an average grain size close to 1 μm.

Figure 4:
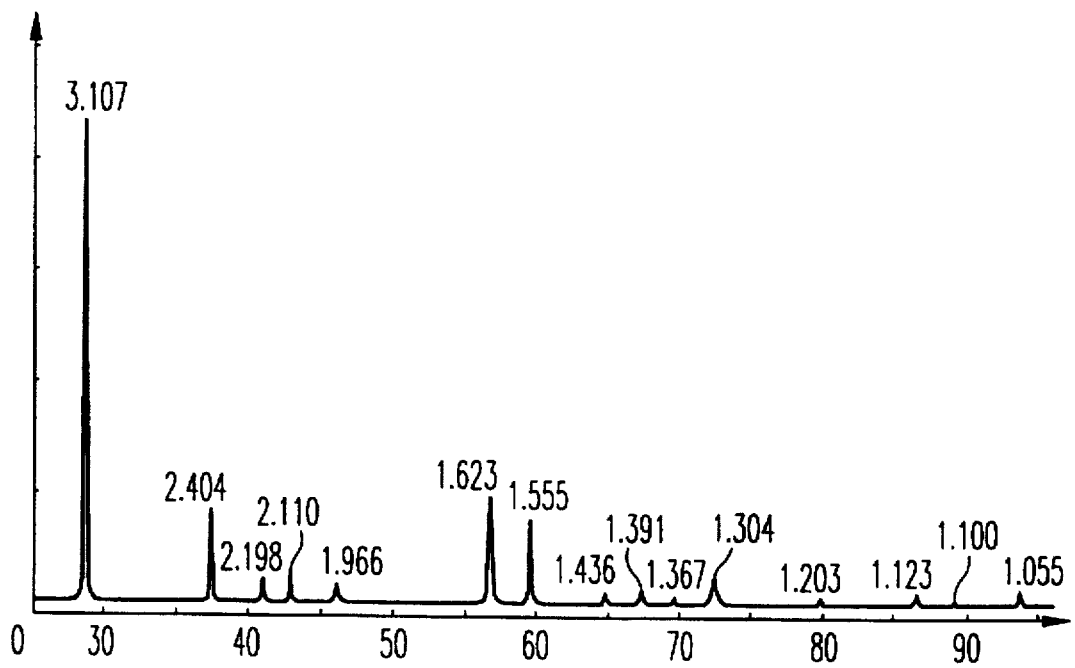

FIG. 4 A X-ray diffraction diagram of the $MnO_2\text{-}\beta$ powder corresponding to FIG. 2.

Figure 5:
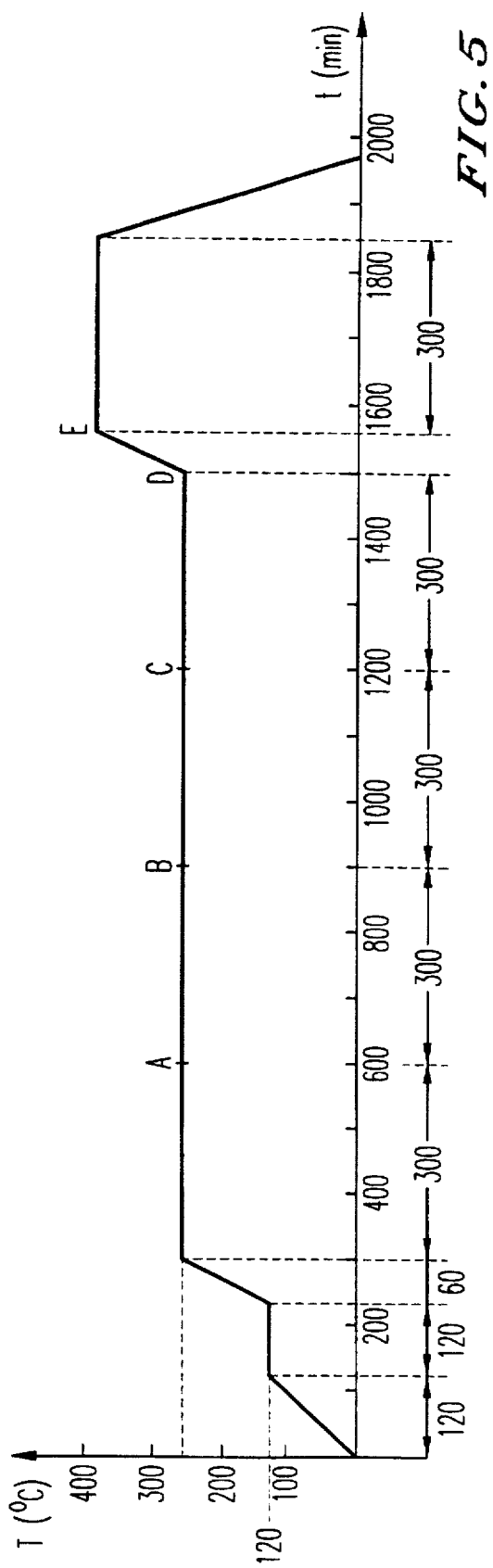

FIG. 5 A thermal treatment used in the invention, the temperature in ° C. as a function of the time in min.

Figure 6:
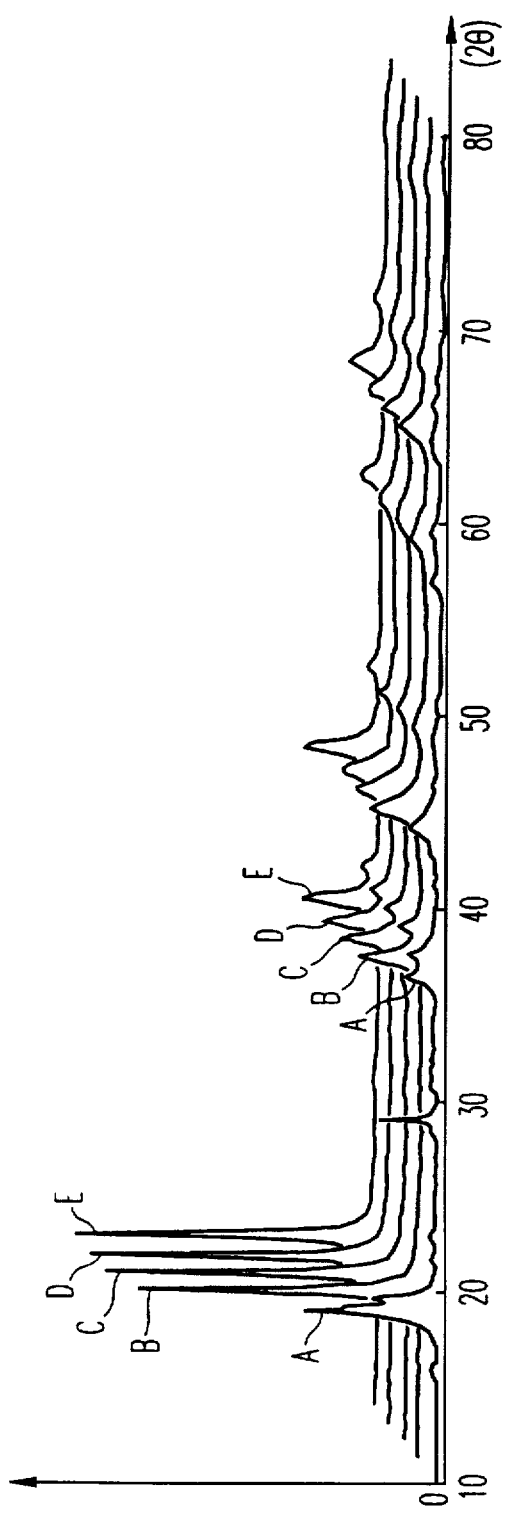

FIG. 6 Successive X-ray diffraction diagrams obtained from the $MnO_2\text{-}\beta$ powder of average grain size close to 1 μm and LiOH subject to the heat treatment of FIG. 5.

Figure 7:
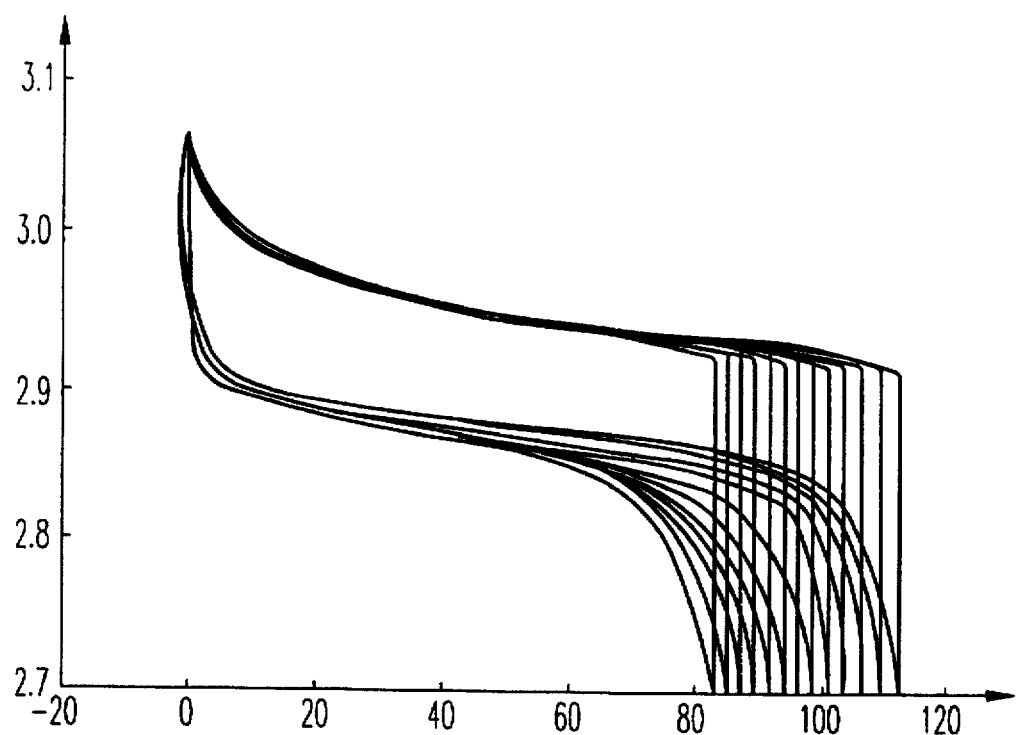

FIG. 7 The evolution of voltage as a function of capacity during galvanostatic cycling of a battery using the compound of the invention.

Figure 8:
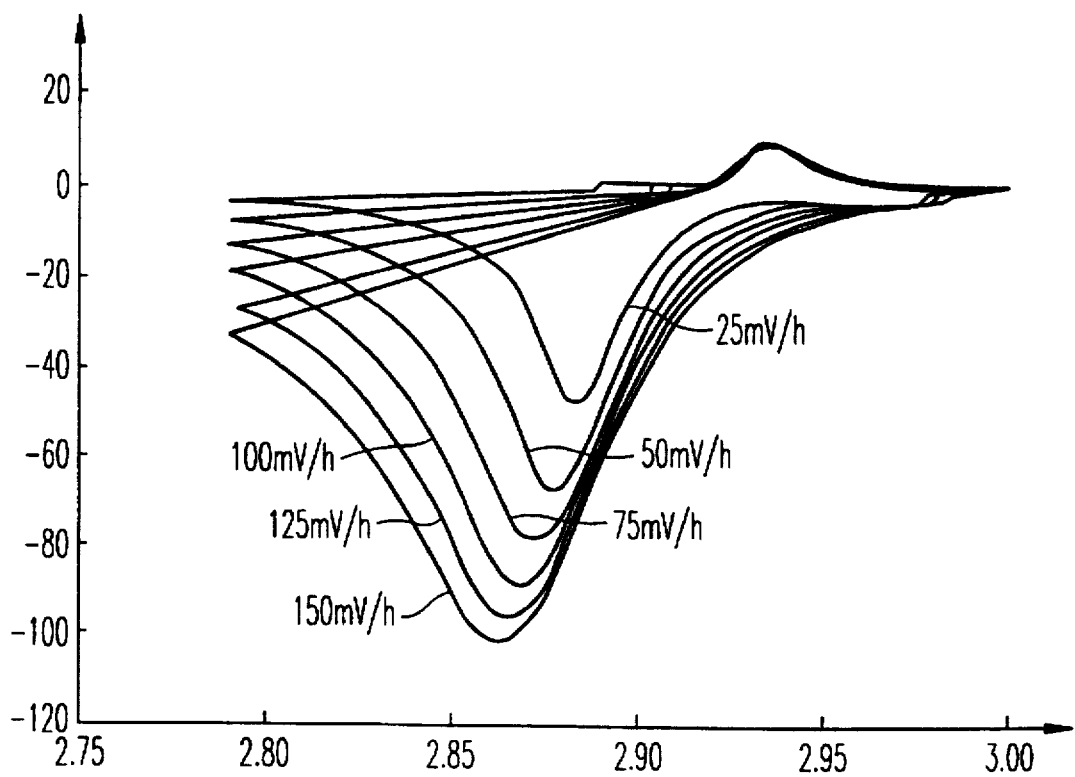

FIG. 8 A kinetic study illustrating the evolution of the standardized intensity as a function of the voltage during cyclic voltametries performed with batteries using a compound according to the invention.

On referring to FIG. 1, which is a diagram illustrating manganese and lithium oxide compositions with on the abscissa the Li/Mn ratio and on the ordinate the degree of oxidation of the manganese, it is possible to see that the compositions according to the invention are represented by the hatched zone defined by the triangle $Li_2Mn_4O_9$, $Li_4Mn_5O_{12}$ and $LiMn_2O_4$.

In this diagram it is also possible to see in broken line form the curve assumed to correspond to the Jahn-Teller effect.

For each initial atomic ratio $\alpha = Li/Mn$, curve 1 of FIG. 2 gives the single value $T\alpha$ of the reaction temperature for which the reaction between $\beta\text{-}MnO_2$ and the lithium compound is complete and leads to a stoichiometric spinel structure product $Li_\alpha MnO_{4(\alpha+1)/3}$ with $\alpha$ equal to the initial Li/Mn atomic ratio. Curve 2 illustrates the degree of oxidation of the manganese in the end product as a function of the reaction temperature.

In FIG. 2 it can be seen that at 150° C. an insertion compound is obtained with an oxidation state of the manganese of 3.5, which constitutes the lower limit. At approximately 500° C., there is a degree of oxidation of 3.9.

Although in FIG. 2 there is a single reaction temperature $T\alpha$ for each initial Li/Mn atomic ratio, it is obviously possible to use the process according to the invention at temperatures above or below $T\alpha$, but in this case the insertion compound obtained would either have a Li/Mn ratio different from the initial ratio, or an increased manganese oxidation state.

The following examples illustrate the preparation of insertion compounds according to the invention and their use in solid and liquid electrolyte lithium batteries.

EXAMPLE 1

In this example, the starting product is a β manganese dioxide powder with a pyrolusite structure in which the manganese is at the degree of oxidation +4 and which has the grain size distribution given in FIG. 3, i.e. grains centred around 1 μm. The X-ray diffraction diagram or pattern of this powder is given in FIG. 4 (powder BP9 B-7333 of SEDEMA, Tertre, Belgium).

This precursor is mixed with LiOH for 2 hours in a ball mill so as to obtain an intimate mixture with atomic proportions Li:Mn=0.65.

The mixture is then placed in a furnace rotating under oxygen scavenging and undergoes the heat treatment illustrated in FIG. 5, which represents the evolution of the temperature (in ° C.) as a function of the time (in min).

At the end of the treatment, the time-stable product formed has a high chemical purity, a small specific surface close to that of the starting powder, namely 4 m²/g, a density very close to the theoretical value of 4.2, a degree of oxidation of the manganese close to +3.83 and a mesh parameter close to 8.15 Å.

FIG. 6 illustrates X-ray diffraction patterns of the product obtained at the following stages of the heat treatment illustrated in FIG. 5:

point A (diagram A) : after 5 h at 250° C.
point B (diagram B) : after 10 h at 250° C.
point C (diagram C) : after 15 h at 250° C.
point D (diagram D) : after 20 h at 250° C.
point E (diagram E) : after 20 h at 250° C. and 5 h at 400° C.

The corresponding physicochemical results are given in Table 1. These results show that in a short time the pyrolusite structure $\beta\text{-}MnO_2$ is completely transformed into a stoichiometric spinel structure having a Li/Mn atomic ratio below $\alpha$ (initial Li/Mn ratio) when T is below $T\alpha$ (stages A to D) where the temperature is 250° C., whereas FIG. 2 gives the temperature $T\alpha$ of 370° C. for the Li/Mn initial ratio of 0.65.

Therefore residual lithium salt is found in the mixture, whose composition does not change, even when the reaction time is 20 hours.

X-ray diagram A also shows that at stage A (250° C., 5 h), $\beta\text{-}MnO_2$ which has not reacted remains (presence of a line at $2\theta=28.6°$).

After only 10 h at 250° C., there is no longer any pyrolusite $\beta\text{-}MnO_2$ which has not reacted. Approximately 6 mole % of the initial LiOH remains in the form $Li_2CO_3$ due to the tendency of LiOH to react with atmospheric carbon dioxide gas, even at low temperatures. The formula of the insertion compound becomes $Li_{0.59}Mn^{+3.65}O_{2.12}$. A longer treatment at 250° C. leads to no modification of the compound obtained, either as regards the degree of oxidation of the manganese, or as regards the X-ray diffraction diagram, the mesh parameter being approximately 8.209 Å between the 10th and 20th hour of treatment.

In stage E when operating above the temperature $T\alpha$ and where slow heating has taken place, there are in fact two stages, a first up to $T\alpha$ and a second above $T\alpha$.

Thus, up to $T\alpha$, an insertion compound of formula $Li_{0.65}Mn^{+3.75}O_{2.2}$ is produced, which corresponds to the complete reaction between the starting compounds. Above $T\alpha$, a lacunary spinel is synthesized having the same LiMn/ atomic ratio, but a manganese oxidation state above the stoichiometric state. During the heat treatment between 250° and 370° C. the remaining lithium salt progressively reacts with the spinel structure. According to FIG. 2 the lithium salt disappears completely at $T\alpha=370°$ C. and the formulation of the stoichiometric spinel formed corresponds to the initial ratio Li/Mn=0.65, namely $Li_{0.65}Mn^{+3.75}O_{2.2}$.

After 5 hours at 400° C., the degree of oxidation of the manganese passes to 3.83, whereas the mesh parameter becomes 8.158 Å and the structure evolves by oxygen incorporation and is transformed into a lacunary structure corresponding to the formulation □ 0.053 $Li_{1.161}Mn_{1.786}O_4$.

Beyond 500° C. and as can be gathered from FIG. 2, the oxidation state of the manganese decreases, the spinel structure loses oxygen and is transformed into stoichiometric spinel with a lower Li/Mn ratio than the initial Li/Mn ratio and into a lithium-rich structure of formula $Li_2MnO_3$ according to the reaction:

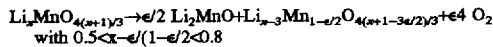

$$Li_xMnO_{4(x+1)/3} \to \epsilon/2\ Li_2MnO + Li_{x-3}Mn_{1-\epsilon/2}O_{4(x+1-3\epsilon/2)/3} + \epsilon 4\ O_2$$
with $0.5 < x - \epsilon/(1-\epsilon/2) < 0.8$ This may explain the maximum ratio Li/Mn=0.75 which can be obtained for the spinel structure observed for an initial Li/Mn ratio of 0.8 at around 470° to 500° C. Here, the formulation of the spinel phase becomes $Li_{2.25}Mn_3O_7$.

Thus, in the temperature range 150° to 500° C., it is possible to obtain a spinel compound in which the degree of oxidation of the manganese can range between 3.5 and 3.92.

EXAMPLE 2

This example illustrates the preparation of an electrode for a solid electrolyte battery.

Firstly preparation takes place of an aqueous suspension containing 50 vol. % of the insertion compound, 10 vol. % carbon and 40 vol. % electrolyte constituted by ethylene polyoxide (POE) and lithium trifluorosulphoneimide (LiTSSI) 3M, the POE/LiTSSI ratio being 14.1.

A nickel current collector with a thickness of 10 μm is covered with this suspension and dried. In the same way preparation takes place of the electrolyte based on POE and LiTSSI and it is spread on the cathode layer. After evaporating the solvent, the total thickness of the nickel-cathode-electrolyte sandwich is below 100 μm. This sandwich is dried in vacuo at a temperature of 115° C. for 48 h.

A battery is prepared in a glove box with an anode constituted by a lithium sheet with an active surface of 50 $cm^2$. The capacity per surface unit of the battery is in the range 0.5 to 2 mAh $cm^{-2}$ according to the insertion compound used. The electrochemical properties of the battery are tested at 77° to 110° C. in the potentiostatic or intensiostatic mode and in cyclic voltametry varying the potential at a rate of 10 or 120 mV/h.

FIG. 7 illustrates the results obtained in galvanostatic cycling with a discharge intensity of 0.12 $mA/cm^2$ and a charge intensity of 0.04 $mA/cm^2$, at 110° C. and with the battery using the insertion compound of example 1 (stage E). FIG. 7 represents the voltage variations in V as a function of the capacity in mAh/g for cycles 20 to 60.

FIG. 8 illustrates the results obtained in cyclic voltametry, at different scavenging rates v and at 110° C. with the insertion compound having a Li/Mn ratio of 0.71. It can be seen that with high discharge rates (C/2)), the polarization of the electrode remains very low, which corresponds to a good kinetic behaviour. The intensity scale is given in mA/g of active material in order to easily evaluate the discharge rate. Thus, with a theoretical capacity at 3V of 150 mAh/g, a standardized average current of 75 mA/g corresponds to a discharge rate of C/2.

Thus, the insertion compounds of the invention are of great interest as an active material in solid electrolyte batteries.

They can also be used in liquid electrolyte batteries. In this case, the insertion compound is mixed with acetylene black and polytetrafluoroethylene in a weight ratio of 70:20:10 in hexane, followed by drying and the formation of diameter 20 mm pellets by compression under a pressure of 200 mPa. Each pallet is then placed in a battery having a lithium anode and an electrolyte e.g. constituted by a 1M $LiClO_4$ solution in a propylene carbonate-ethylene carbonate-dimethyl ether mixture (1:1:2), so as to give batteries which can be charged and discharged at rates around C/40 between 2.0 and 3.5V.

TABLE 1

| Heat treatment stage of FIG. 1 | Temp. (°C.) | Time (h) | Manganese oxidation state (end compound) | Mesh parameter | Comment |
|---|---|---|---|---|---|
| A | 250 | 5 | | 8.208 ± 0.012 | Presence of β-$MnO_2$ and $Li_2CO_3$ |
| B | 250 | 10 | 3.63 ± 0.015 | 8.209 ± 0.006 | Complete reaction of β-$MnO_2$, presence of $Li_2CO_3$ |
| C | 250 | 15 | 3.65 ± 0.015 | 8.211 ± 0.006 | Complete reaction of β-$MnO_2$, presence of $Li_2CO_3$ |
| D | 250 | 20 | 3.645 ± 0.015 | 8.209 ± 0.006 | Complete reaction of β-$MnO_2$, presence of $Li_2CO_3$ |
| E | 400 | 5 | 3.83 ± 0.015 | 8.158 ± 0.004 | Lacunary spinel structure |

We claim:

1. Process for the preparation of an insertion compound based on manganese and lithium oxide by reaction in the solid state between the manganese oxide and a lithium compound, wherein a manganese oxide powder $MnO_2$-β, having a specific surface below 7 $m^2$/g and an average grain size below 10 μm, is reacted with a powder of a lithium compound selected from the group consisting of lithium oxides, hydroxides, carbonates and nitrates, which may or may not be hydrated, at a temperature of 150° to 500° C. for a time adequate to convert said $MnO_2$-β into manganese and lithium oxide with a lacunary or stoichiometric spinel structure.

2. Process according to claim 1, wherein the average grain size of the $MnO_2$-β powder is 0.5 to 5 μm.

3. Process according to claim 1 or 2, wherein said manganese oxide powder $MnO_2$-β has a pyrolusite structure.

4. Process according to claim 1, wherein the quantities of $MnO_2$-β and lithium compound are such that the Li/Mn ratio is 0.5 to 1.

5. Process according to claim 1 or 2, wherein the lithium compound is $Li_2CO_3$ or LiOH.

6. Process according to claim 1 or 2, wherein the reaction is performed in a rotary furnace under oxygen scavenging.

7. Process according to claim 1 or 2, wherein the reaction time is 5 to 150 h.

8. Process according to claim 1 or 2, wherein the Li/Mn atomic ratio and the degree of oxidation of the manganese of the insertion compound obtained are regulated by choosing the reaction temperature as a function of the initial Li/Mn atomic ratio between $MnO_2$-β and the lithium compound.

9. The process according to claim 1, wherein said manganese and lithium oxide with a lacunary or stoichiometric spinel structure has a Li/Mn atomic ratio of 0.5 to 0.75, a degree of oxidation of the manganese between +3.5 and +3.92, a specific surface below 7 $m^2/g$ and a mesh parameter between 8.12 and 8.25 Å corresponding to a density between 4.1 and 4.5.

10. The process according to claim 1, wherein said manganese and lithium oxide with a lacunary or stoichiometric spinel structure consists essentially of lithium, manganese and oxygen.

* * * * *